United States Patent [19]

Southwick

[11] Patent Number: 5,358,981
[45] Date of Patent: Oct. 25, 1994

[54] SOLVENT-FREE WATER-BASED EMULSIONS OF ANIONICALLY POLYMERIZED POLYMERS

[75] Inventor: Jeffrey G. Southwick, Houston, Tex.

[73] Assignee: Shell Oil Company, Houston, Tex.

[21] Appl. No.: 66,598

[22] Filed: May 24, 1993

Related U.S. Application Data

[63] Continuation-in-part of Ser. No. 986,192, Dec. 7, 1992, abandoned.

[51] Int. Cl.⁵ .................................................. C08K 3/20
[52] U.S. Cl. ............................... 523/402; 523/406; 523/413; 524/556; 524/560; 524/571; 524/572; 524/575
[58] Field of Search ........................ 523/402, 406, 413; 524/571, 572, 556, 560, 575

[56] References Cited

U.S. PATENT DOCUMENTS

| | | | |
|---|---|---|---|
| 4,177,177 | 12/1979 | Vanderhoff et al. | |
| 4,239,672 | 12/1980 | Zima et al. | 524/549 |
| 4,420,512 | 12/1983 | Ogawa et al. | 523/406 |
| 5,266,642 | 11/1993 | Piejko et al. | 525/308 |

*Primary Examiner*—Melvyn I. Marquis
*Assistant Examiner*—Mark D. Sweet
*Attorney, Agent, or Firm*—Donald F. Haas

[57] ABSTRACT

A process of making a solvent-free water-based emulsion of an anionically polymerized polymer which comprises: heating the polymer until its viscosity is no more than 3,000 centipoise, (b) mixing water with a surfactant, (c) adding the mixture of (b) to the polymer of (a) while agitating the polymer at high speed, thereby forming an emulsion, (d) cooling the emulsion to below 100° C., and (e) optionally subjecting the emulsion to turbulent flow and/or cavitation. Also included are emulsions of such polymers.

2 Claims, No Drawings

SOLVENT-FREE WATER-BASED EMULSIONS OF ANIONICALLY POLYMERIZED POLYMERS

This is continuation-in-part of application Ser. No. 07/986,192, filed Dec. 7, 1992, now abandoned.

BACKGROUND OF THE INVENTION

The present invention relates to solvent-free water-based emulsions of anionically polymerizable polymers. Specifically, the invention relates to solvent-free water-based emulsions of hydrogenated butadiene diols, epoxidized diene polymers and acrylic monomer-containing block copolymers.

Anionically polymerized polymers are well known. Polymers such as polystyrene, polybutadiene, polyisoprene, styrene/butadiene rubber, block copolymers of vinyl aromatic hydrocarbons and conjugated dienes, etc. exhibit excellent properties and have a wide variety of uses including coatings and adhesives. However, such polymers are not water soluble and this lack of solubility in water limits their usefulness in efforts to replace solvent based adhesive, sealants, and coatings with equivalent water-based systems.

Water-based dispersions of such polymers can easily be prepared by diluting the polymers with solvent, emulsifying the low viscosity organic phase into an aqueous surfactant solution with a high shear mixer and stripping off the solvent. Such dispersions are quite useful but they suffer from the disadvantage that a solvent must be used in preparation and thus must be disposed of, increasing the cost and environmental hazards. It would be highly advantageous to be able to produce films from water-based emulsions of polymers which have the properties of films produced by hot melt or solvent casting with the above anionically polymerized polymers without the necessity of incorporating a solvent in the preparation of the dispersion. Such emulsions or dispersions would have very low viscosity even with high molecular weight polymers and could be applied as formulated coatings or adhesives in a solvent-free system. Optionally, small amounts of organic solvent could be added to these systems as coalescing aids.

U.S. Pat. No. 4,239,672 describes a method for emulsifying low molecular weight polybutadienes which have been maleated or epoxidized. Example 5 describes the emulsification of a very low molecular weight liquid polybutadiene having a viscosity of 30 cp. This emulsification was carried out without the use of any solvent. Other examples in the patent describe the emulsification of a liquid butadiene homopolymer with a viscosity of 750 cp. In each of these examples, a significant amount of solvent was used. The first polybutadiene had a viscosity low enough to allow it to be emulsified with stirring used as the mixing technique, a rather low intensity mixing technique. The higher viscosity polymer required solvent to allow it to be emulsified using the same low intensity mixing technique.

SUMMARY OF THE INVENTION

The solvent-free water-based emulsions of the present invention are made by first heating an anionically polymerized polymer to a temperature at which its viscosity is no more than 3,000 centipoise (cp), separately mixing water with a surfactant, adding the mixture to the polymer while agitating the polymer with a high speed mixer thereby forming an emulsion, cooling the emulsion to below 100° C. and then preferably subjecting the emulsion to turbulent flow and/or cavitation such that the dissipation of energy into the emulsion is greater than $10^8$ watts per cubic meter in a device such as a high pressure orifice homogenizer such as a Microfluidics 110-F manufactured by Microfluidics Corp. With low molecular weight highly polar polymers, passing the emulsion through the homogenizer is unnecessary. This process can be used to make a solvent-free water-based emulsion of from 20 to 80% by weight of an anionically polymerized polymer such as a hydrogenated polybutadiene diol generally having a molecular weight of no more than 10,000 or an epoxidized diene star polymer generally having a molecular weight of no more than 150,000. Generally, 0.5 to 5% surfactant is used. The anionically polymerized polymer which is emulsified according to the present invention should have a viscosity of at least 500 cp.

DETAILED DESCRIPTION OF THE INVENTION

In general, when solution anionic techniques are used, functionalized derivatives of conjugated diolefin polymers, alkenyl aromatic hydrocarbon polymers and copolymers of conjugated diolefins and alkenyl aromatic hydrocarbons are prepared by first contacting the monomer or monomers to be polymerized simultaneously or sequentially with an anionic polymerization initiator such as group IA metals, their alkyls, amides, silanolates, napthalides, biphenyls and anthracenyl derivatives. It is preferred to use an organo alkali metal (such as sodium or potassium) compound in a suitable solvent at a temperature within the range from about 50° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4. Such processes are well known and are described in U.S. Pat. Nos. 4,039,593 and Re. 27,145 which are herein incorporated by reference. The polymers made can be linear in structure or branched or they may be star polymers which have a plurality of polymer arms extending from a central core. Such polymers are well known as is their method of manufacture (see, for example, U.S. Pat. Nos. 3,231,635, 3,265,765 and 4,444,953 which are herein incorporated by reference).

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

In general, any of the solvents known in the prior art to be useful in the preparation of such polymers may be used. Suitable solvents, then, including straight- and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl-substituted derivatives thereof; aromatic and alkyl-substituted aromatic hydrocarbons such as benzene, napthalene, toluene, xylene and the like; hydrogenated aromatic hydrocarbons such as tetraline, decalin and the like; linear and cyclic ethers such as methyl ether, methylethyl ether, diethyl ether, tetrahydrofuran and the like.

The anionic polymerization of the conjugated diene hydrocarbons is typically controlled with structure modifiers such as diethylether or glyme (1,2-diethoxyethane) to obtain the desired amount of 1,4-addition. As described in U.S. Pat. No. Re. 27,145 which is incorporated by reference herein, the level of 1,2-addition of a butadiene polymer or copolymer can greatly affect elastomeric properties after hydrogenation.

The 1,2-addition of 1,3-butadiene polymers having terminal functional groups significantly and surprisingly influences the viscosity of the polymers as described in more detail below. A 1,2-addition of about 40% is achieved during polymerization at 50° C. with about 6% by volume of diethylether or about 1000 ppm of glyme.

Dilithium initiation with the diadduct of sec-butyllithium (s-BuLi) and m-diisopropenylbenzene also requires presence of a non-reactive coordinating agent such as diethyl ether, glyme, or triethyl amine, otherwise monolithium initiation is achieved. Ether is typically present during anionic polymerization as discussed above and the amount of ether typically needed to obtain specific polymer structures has been sufficient to provide dilithium initiation.

Anionic polymerization is often terminated by addition of water to remove the lithium as lithium hydroxide (LiOH) or by addition of an alcohol (ROH) to remove the lithium as a lithium alkoxide (LiOR). For polymers having terminal functional groups, the living polymer chains are preferably terminated with hydroxyl, carboxyl, phenol, epoxy, or amine groups by reaction with ethylene oxide, carbon dioxide, a protected hydroxystyrene monomer, ethylene oxide plus epichlorohydrin, or the amine compounds listed in U.S. Pat. No. 4,791,174 (which is herein incorporated by reference), respectively.

Termination with carbon dioxide results in carboxylate salt groups that reduce hydrogenation catalyst activity as described in U.S. Pat. No. 4,970,254 which disclosure is incorporated by reference herein. Improved hydrogenation is obtained by converting the carboxylate salt groups to ester groups prior to hydrogenation and then reconverting to carboxylate salt or carboxylic acid groups after hydrogenation.

Hydrogenation of at least 90%, preferably at least 95%, of the unsaturation in low molecular weight butadiene polymers is achieved with nickel catalysts as described in U.S. Pat. No. Re. 27,145 and U.S. Pat. No. 4,970,254 and U.S. patent application Ser. No. 07/785,715 which are incorporated by reference herein. The preferred nickel catalyst is a mixture of nickel 2-ethylhexanoate and triethylaluminum.

Butadiene polymers having two or more terminal functional groups selected from hydroxyl, carboxyl, phenol, epoxy, and amine groups can be used without solvents when the viscosity of the polymer is less than about 500 poise. These functional groups do not exhibit significant atomic attractions that would otherwise solidify the functionalized polymers. Hydrogenated butadiene polymers having a lower viscosity than 50,000 cp are produced by limiting the peak molecular weight to a range from 500 to 20,000 and by limiting the 1,2-addition to an amount between 30% and 70%, preferably between 40% to 60%.

It is well known that the viscosity of higher molecular weight polymers is proportional to molecular weight raised to the 3.4 power as described by D. W. Van Krevelen, "Properties of Polymers", Elsevier Scientific Pub. Co., New York, 1976, pp. 337-339, and J. D. Ferry, "Viscoelastic Properties of Polymers", John Wiley & Sons, New York, 1970, pp. 267-271. For low molecular weight polymers having no functional groups, viscosity is proportional to molecular weight to the first power. Low molecular weight polymers having terminal functional groups behave like higher molecular weight polymers. Therefore, in comparing the viscosity of low molecular weight polymers having terminal functional groups, viscosity data must be adjusted for molecular weight variations by dividing measured viscosity by molecular weight raised to the 3.4 power.

The epoxidized polymers which can be dispersed in a solvent-free water-based emulsion according to the present invention are polymers which are based on anionically polymerized polymers such as those described above. These are polymers which contain conjugated dienes and/or vinyl aromatic hydrocarbons. These polymers are epoxidized to produce the epoxidized polymers used in the process of the present invention and claimed herein.

The epoxidized copolymers of this invention can be prepared by the epoxidation procedures as generally described or reviewed in the *Encyclopedia of Chemical Technology* 19, 3rd ed., 251-266 (1980), D. N. Schulz, S. R. Turner, and M. A. Golub, *Rubber Chemistry and Technology*, 5, 809 (1982), W-K. Huang, G-H. Hsuie, and W-H. Hou, *Journal of Polymer Science, Part A: Polymer Chemistry*, 26, 1867 (1988), and K. A. Jorgensen, *Chemical Reviews*, 89, 431 (1989), and Hermann, Fischer, and Marz, *Angew. Chem. Int. Ed. Engl.* 30 (No. 12), 1638 (1991), all of which are incorporated by reference.

For instance, epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent such as toluene, benzene, hexane, cyclohexane, methylenechloride and the like and epoxidation conducted in this new solution or can be epoxidized neat. Epoxidation temperatures on the order of 0° to 130° C. and reaction times from 0.1 to 72 hours may be utilized. When employing hydrogen peroxide and acetic acid together with a catalyst such as sulfuric acid, the product can be a mixture of epoxide and hydroxy ester. The use of peroxide and formic acid in the presence of a strong acid may result in diolefin polymer blocks containing both epoxide and hydroxy ester groups. Due to these side reactions caused by the presence of an acid and to gain the maximum selectivity with respect to different levels of substitution on the olefinic double bonds, it is preferable to carry out the epoxidation at the lowest possible temperature and for the shortest time consistent with the desired degree of epoxidation. Epoxidation may also be accomplished by treatment of the polymer with hydroperoxides or oxygen in the presence of transition metals such as Mo, W, Cr, V and Ag, or with methyltrioxorhenium/hydrogen peroxide with and without amines present. $^1$H NMR is an effective tool to determine which and how much of each type of ODB is epoxidized. Further, the amount of epoxy can also be measured by the direct titration with perchloric acid (0.1N) and quaternary ammonium halogenide (tetraethyl-ammonium bromide) where the sample is dissolved in methylene chloride. Epoxy titration is described in *Epoxy Resins Chemistry and Technology*, edited by Clayton A. May and published in 1988 (p. 1065) which is herein incorporated by reference.

The acrylic monomer-containing block copolymers which may be used according to the present invention are polymers of conjugated dienes and/or vinyl aromatic hydrocarbons and acrylic monomers of the formula described above such as alkyl methacrylates or derivatives of alkyl methacrylates such as hydrolyzed alkyl methacrylates or anhydride derivatives thereof. Other suitable acrylic monomers include acrylates, such as t-butyl acrylate; cyclic alkyl methacrylates, such as 2,6-dimethylcyclohexyl methacrylate; and acrylates in which the alkyl group contains an ether linkage, such as tetrahydrofuran acrylate. Copolymers containing two or more conjugated dienes are useful herein. Copolymers of conjugated dienes and acrylic monomers with vinyl aromatic monomers are preferred and both random and block copolymers thereof are useful herein. The description which follows is described in terms of block copolymers of conjugated dienes, alkyl methacrylates and vinyl aromatic hydrocarbons but it is applicable also to the other polymers described in this paragraph. This means that this invention encompasses functionalized polymers which are not block copolymers but which incorporate the functionality as described below.

It may be desirable to functionalize these block copolymers of methacrylate and rubber. However, the routes to acid functionalizing involve exposing the polymer to: (1) heat which eliminates isobutylene and water to form a methacrylic anhydride which then forms methacrylic acid upon exposure to water, or (2), hydrolysis of the ester group by heating (70°–90° C.) a polymer solution in the presence of an acid or acid catalyst. Both routes can possibly degrade and/or crosslink unsaturated rubber if not done carefully. To circumvent this problem it is preferred that the rubber block be hydrogenated.

The block copolymers may be produced by any well known block polymerization or copolymerization procedures including the well-known sequential addition of monomer techniques, incremental addition of monomer technique or coupling technique. Star polymers can be made by coupling with a multifunctional coupling agent such as divinyl benzene. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. The manufacture of such polymers containing alkyl methacrylates is described in U.S. Pat. No. 5,002,676 and copending commonly assigned application Ser. No. 525,812, filed May 21, 1990, both of which are herein incorporated by reference.

Conjugated dienes which may be utilized to prepare the polymers and copolymers include those having from 4 to 8 carbon atoms and also include 1,3-butadiene, 2-methyl-1,3-butadiene(isoprene), 2,3-dimethyl-1,3-butadiene, 1,3-pentadiene, 1,3-hexadiene and the like. Mixtures of such conjugated dienes may also be used. The preferred conjugated dienes are 1,3-butadiene and isoprene.

Vinyl aromatic hydrocarbons which may be utilized to prepare copolymers include styrene, o-methylstyrene, p-methylstyrene, p-tertbutylstyrene, 2,4-dimethylstyrene, alpha-methylstyrene, vinylnapthalene, vinylanthracene and the like. The preferred vinyl aromatic hydrocarbon is styrene.

Alkyl methacrylates are preferred for use herein and those employed herein include methacrylates wherein the alkyl group has up to 14 carbon atoms inclusive. Derivatives of these polymers are also included herein, such as, for example, polymers with partially or completely acidified methacrylate groups, their anhydrides, their ionomers, their reaction products with alcohols and amines, and the like. Derivatives of alkyl methacrylates include methacrylic acid, methacrylic acid salts (for example, zinc, sodium and quaternary ammonium salts) and anhydrides formed between adjacent acid units by heating. Illustrative of such methacrylate esters are methyl methacrylate, ethyl methacrylate, sec-butyl methacrylate, t-butyl methacrylate, i-amyl methacrylate, hexyl methacrylate, decyl methacrylate and dodecyl methacrylate.

The present invention works with both unhydrogenated and hydrogenated polymers. The hydrogenation of these polymers and copolymers may be carried out by a variety of well established processes including hydrogenation in the presence of such catalysts as Raney Nickel, noble metals such as platinum, palladium and the like, soluble transition metal catalysts and titanium biscyclopentadienyl catalysts as discussed above.

The acrylic monomer content of the polymer is generally no more than about 20% but acrylic monomer contents of up to 70% are possible. Generally, the acrylic monomer may be present in the polymer in an amount from about 1% to about 20% because lower amounts will not provide the advantages of the present invention and higher amounts are not advantageous from a cost standpoint. All percentages expressed above are weight percentages based on the total weight of the polymer.

As discussed briefly above with respect to the terminally functionalized polydiene polymers, the viscosity of these polymers is related to the molecular weight. Generally, the higher the molecular weight, the higher the viscosity. In order to achieve the viscosity goal set forth above, the polymers used in the present invention should have a molecular weight of no more than 10,000 for linear polymers and no more than 150,000 for star polymers. Preferably, the molecular weight should range from 3,000 to 4,000 for linear polymers and 80,000 to 120,000 for star polymers. This will ensure that the polymer can be used, possibly with heating, in the process of the present invention.

Molecular weights of linear polymers or unassembled linear segments of polymers such as mono-, di-, triblock, and etc., arms of star polymers before coupling are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodisperse and it is both convenient and adequately descriptive to report the "peak" molecular weight of the narrow molecular weight distribution observed. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, M. W. Yau, J. J. Kirkland, D. D. Bly, John Wiley & Sons, New York, N.Y., 1979.
2. *Light Scattering from Polymer Solutions*, M. B. Huglin, ed., Academic Press, New York, N.Y. 1972.
3. W. Kay and A. J. Havlik, *Applied Optics*, 12, 541 (1973).
4. M. L. McConnell, *American Laboratory*, 63, May, 1978.

The polymer used in the present invention should have a melt viscosity of at least 500 cp. Polymers having melt viscosities much lower than 500 cp may be emulsified without using the high intensity mixing required by the present invention. Since this would add to the expense of processing, there is no reason to use the process of the present invention with polymers having a viscosity lower than 500 cp. However, polymers having a viscosity of 500 cp or greater cannot be successfully emulsified in the absence of solvent without using the process of the present invention. Such polymers having a viscosity of less than 500 cp are really free flowing liquids whereas the polymers for which the present invention is advantageous are syrupy polymers.

The first step of the process is to ensure that the polymer has a viscosity of no more than 3,000 cp for the reasons discussed above. If the polymer has such a viscosity at room temperature, so much the better. The lower the viscosity the easier the emulsification. Polymers with viscosities substantially more than 3,000 cp cannot be successfully dispersed by the process described herein without first dissolving the polymer in solvent. Therefore, the polymers which can be used in the process of the present invention can only be polymers which have a viscosity of no more than 3,000 cp at a temperature which is reasonable for making water-based emulsions, certainly no more than 250° C. because of problems with degradation. This is especially important for unhydrogenated polymers. Ideally, the operating temperature for heating the polymer during the making of the emulsion of the present invention should be less than 100° C. so the problems associated with boiling water are avoided.

In a separate step, a surfactant is mixed with water and the mixture is preferably heated to a temperature of from 20° to 100° C. because then it does not too rapidly cool the polymer when they are mixed. It is desirable to keep the temperature below 100° C. because expensive high pressure equipment will be necessary in order to heat water above 100° C. Anionic or cationic surfactants can be used. Examples of anionic surfactants include sulfates, including sodium dodecyl sulfate, sulfonates, carboxylates, ethoxy sulfates and ethoxy sulfonates. Other specific examples include sodium lauryl sulfate, sodium salt of sulfated Neodol® alcohols, sodium salts of sulfated Neodol® ethoxylates, sodium dodecyl benzene sulfonate, sodium alkyl napthalene sulfonate, sodium dioctyl sulfosuccinate. Salts of sulfated alkyl-phenol ethoxylates are also effective anionic emulsifiers. Examples of effective cationic surfactant emulsifiers include cetyl trimethyl ammonium chloride, coco-trimethyl ammonium chloride, and di-coco-dimethyl ammonium chloride.

The amount of surfactant used generally varies from 0.5 to 5.0% by weight of polymer. Preferably, the amount of surfactant should be less than 1% because surfactant is known to interfere with adhesion and moisture barrier properties.

Next the water/surfactant mixture is added to the heated polymer while the polymer is agitated at high speed in a high speed mixer such as a Silverson mixer (for example, at 6000 rpm), thereby forming an emulsion. The high speed mixer used according to the present invention should be capable of a speed of at least 5000 rpm. At this point heating is reduced in order for the mixture to cool below 100° C. so that a substantial loss of water due to boiling does not occur. Optionally, heating could be continued above 100° C. if the procedure were performed in a high pressure rated, closed system. This option may be preferred to produce small particle size dispersions, but involves more complex and expensive equipment. It is important that the agitation of the polymer be carried out at a high shear rate in order to form a small particle size, and therefore stable emulsion. Otherwise, relatively large particle size droplets will be formed and the emulsion will not be stable.

Next, the emulsion is cooled. It may be cooled to below 100° C., preferably 20° to 50° C., and the particle size is preferably further reduced by subjecting the emulsion to turbulent flow and/or cavitation such that the dissipation of energy into the fluid is greater than 108 watts per cubic meter. Sonicators could be utilized but an apparatus such as the Model M110-F Microfluidizer, available from Microfluidics Corp., Newton, Mass., has been demonstrated to perform well and is therefore preferred. This dispersion device pressurizes the fluid to about 16,000 psi and passes the fluid through first a 250 micron orifice interaction chamber, followed by a 150 micron orifice interaction chamber. The chambers contain channels which provide a focused interaction zone of intense turbulence causing a release of energy amid both cavitation and shear forces. The emulsion may be passed through a disperser such as this for a plurality of passes in order to create an extremely small particle size. Sonicators produce mostly cavitation and the Microfluidizer produces turbulent flow.

Although it is preferable to pass the emulsion through the Microfluidics homogenizer as a second step in the process to achieve an average particle size of less than one micron, for polymers which have relatively low molecular weights, i.e. less than 5,000, or high levels of polar functionality, i.e. more than 10%, the homogenizer will not be necessary. Examples of highly polar polymers include low molecular weight methacrylic acid-containing diene block copolymers. Polar functionality increases polymer compatibility with water reducing the amount of energy required to disperse it into very fine droplets. Energy requirements for dispersal are also reduced for lower molecular weight polymers because at a given process temperature they will result in lower viscosity systems.

The following is a discussion of specific polymers which can be used according to the present invention to create solvent-free water-based emulsions. Other polymers not mentioned here may also be utilized in the process of the present invention. Epoxidized diene polymers are especially suitable for use herein, especially star polymers but also including linear polymers. These include diene homopolymers and random and block copolymers of dienes and vinyl aromatic hydrocarbons such as styrene. Both linear and star polymers of this type can be used as well as hydroxyl, amine and chlorohydrin derivatives of such polymers. Linear polyol polymers are also especially suitable for use herein including linear diols and star polyols. Also, isocyanate and polyester derivatives of such polymers are included herein. Conventional diene and vinyl aromatic hydrocarbon block copolymers may also be utilized herein if they satisfy the viscosity and molecular weight requirements specified above. As discussed above, the acrylic monomer-containing polymers may be used in either the ester or acid form in either linear or star configuration. Such polymers can be block copolymers having the following configurations: acrylic monomer-diene-acrylic monomer, styrene-diene-acrylic monomer and styrene-diene-styrene-acrylic monomer. Such polymers can be unsaturated or hydrogenated and amine derivatives of such polymers can also be used herein. Further, hydrogenated block copolymers of dienes and vinyl aromatic hydrocarbons having polar functional groups grafted thereto can also be used herein. Specific examples include maleic anhydride, glycidyl acrylate, and hydroxy ethyl acrylate which are grafted onto a styrene-diene-styrene block copolymer. Also included are amine, amine/acid and isocyanate derivatives of such polymers. Also included are partially unsaturated block copolymers of vinyl aromatic hydrocarbons and conjugated dienes, i.e. having from 0.1 to 3 meq/g unsaturation.

The emulsions of the present invention are highly useful for formulating into water base coatings and adhesive products. The diols can react with di-isocyanates and result in flexible coatings. Epoxidized diene polymers can be cured to form useful adhesive or coatings products by electron beam radiation, ultraviolet radiation or chemical curing agents.

EXAMPLES

Example 1

An emulsion of a 3400 molecular weight hydrogenated polybutadiene diol was prepared herein. Eighty-five grams of the polymer was placed in a 500 milliliter round bottom flask fitted with a Silverson mixer, and the temperature was brought to about 110° C. with a heating mantle. Eighty-five grams of water was heated to 70° C. and mixed with five phr of Calsoft 90 surfactant (sodium dodecyl benzene sulfonate) and added to the polymer. The polymer and the water mixture were mixed at 6000 rpm for about 10 minutes wherein the emulsion formed. The emulsion was poured into a bottle and as the emulsion cooled to 25° C., a water layer formed at the bottom of the bottle. This water was separated and the final emulsion solids was raised to 69%. The particle size ranged from 0.3 to 3.5 microns. Later, the emulsion was put through a Microfluidics 110-F and the final particle size was 0.1 to 2.0 microns. The emulsion was stable.

Example 2

160 grams of a 110,000 molecular weight epoxidized isoprene star polymer having ~18 arms was put into a 500 milliliter round bottom flask fitted with a Silverson mixer and the polymer was heated with stirring to a temperature of about 134° C. 160 grams of water containing 5 phr of Calsoft 90 surfactant was heated to 85° C. and quickly added to the polymer. The polymer and water solution were vigorously mixed at 6000 rpm for about 10 minutes and the temperature was gradually allowed to decrease to 89° C. The emulsion was poured into a bottle. After about 5 minutes, some of the polymer rose to the top of the solution with a water layer on the bottom. The solution was then put through a Microfluidics 110-F. A water layer again formed and was removed. The average particle size of the emulsion was about 0.3 microns and the final solids content of the polymer emulsion was 58%.

I claim:

1. A solventless process of making a solvent-free water-based emulsion of an anionically polymerized polymer having a melt viscosity of at least 500 cp which comprises:
   (a) heating the polymer until its viscosity is no more than 3,000 cp,
   (b) mixing water with a surfactant,
   (c) adding the mixture of (b) to the polymer of (a) while agitating the polymer at at least 5000 rpm, thereby forming an emulsion,
   (d) cooling the emulsion to below 100° C., and
   (e) optionally, subjecting the emulsion to turbulent flow and/or cavitation such that the dissipation of energy into the emulsion is greater than $10^8$ watts per cubic meter.

2. The process of claim 1 wherein the polymer is selected from the group consisting of hydrogenated polydiene diols, acrylic monomer-containing block copolymers and epoxidized diene polymers.

* * * * *